3,221,005
AZO DYES FROM 5-AMINO-1,2,4-THIADIAZOLES
William H. Moore, Edmund B. Towne, and Joseph B. Dickey, Kingsport, Tenn., assignors to Eastman Kodak Company, Rochester, N.Y., a corporation of New Jersey
No Drawing. Filed Aug. 30, 1962, Ser. No. 220,574
5 Claims. (Cl. 260—158)

This invention relates to azo compounds obtained by diazotization of certain 5-amino-1,2,4-thiadiazoles and coupling with aminonaphthol sulfonic acids. The compounds are water soluble and particularly suited to dyeing wool and silk fibers but do not readily dye cotton, viscose, cellulose acetate and other hydrophobic fibers including polyester and acrylic fibers.

The dyes have the following general formula

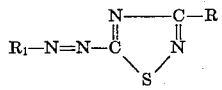

wherein R represents a hydrogen atom, a lower alkylthio radical such as $CH_3S-$, $C_2H_5S-$, $i-C_3H_7S-$ and $C_4H_9S-$, lower alkylsulfonyl such as $CH_3SO_2-$, $C_2H_5SO_2-$, $C_3H_7SO_2-$ and $C_4H_9SO_2-$, halogen including chloro, bromo, and iodo, lower aryl alkylthio such as $C_6H_5CH_2S-$, $C_6H_5C_4H_8S-$, $o-NO_2-C_6H_5CH_2S-$, $CH_3C_6H_4CH_2S-$ or aryl lower alkyl sulfonyl such as $C_6H_5CH_2SO_2-$, $C_6H_5C_3H_6SO_2-$, $o-Cl-C_6H_4CH_2SO_2-$, the aryl radicals of which are monocyclic radicals of the benzene series, and $R_1$ represents the residue of an amino-α-naphthol sulfonic acid coupling component.

The 5 - amino-3-alkylthio-1,2,4-thiadiazoles useful in preparing the dyes are prepared by reacting an alkyl isothiuronium salt with sodium thiocyanate in the presence of bromine and sodium methoxide in methanol [Ber., 89 2742 (1956)]. The 3-alkylsulfonyl derivatives are prepared by oxidation of the 3-alkylthio compounds with hydrogen peroxide instead of phthalic monoperacid as described in [Ber., 89 2747 (1956)]. 5-amino-1,2,4-thiadiazole is prepared from formamidine hydrochloride, sodium thiocyanate, bromine and sodium methylate [Ber., 87, 57 (1954)]. Representative 5 - amino - 1,2,4-thiadiazoles are:

5-amino-3-methylthio-1,2,4-thiadiazole
5-amino-3-ethylthio-1,2,4-thiadiazole
5-amino-1,2,4-thiadiazole
5-amino-3-methylsulfonyl-1,2,4-thiadiazole
5-amino-3-isobutylthio-1,2,4-thiadiazole
5-amino-3-chloro-1,2,4-thiadiazole
5-amino-3-benzylthio-1,2,4-thiadiazole
5-amino-3-phenylethylthio-1,2,4-thiadiazole
5-amino-3-phenylbutylthio-1,2,4-thiadiazole
5-amino-3-phenylmethylsulfonyl-1,2,4-thiadiazole
5-amino-3-phenylpropylsulfonyl-1,2,4-thiadiazole In a typical dyeing process, one hundred milligrams of the dye was dissolved in 150 ml. of water containing 3 ml. of wetting agent solution. The bath was made up to 300 ml. and 10 g. of wool flannel was entered. The bath was brought up to boil and after 15 min., 5 ml. of acetic acid was added. After another 15 min., 2 g. of sodium sulfate was added to the bath and the dyeing was continued for 30 min., after which the fabric was rinsed and dried in an oven at 250° F.

The following examples will serve to illustrate the preparation and properties of the intermediates and dyes of the invention. The invention contemplates the dyes in the free acid form or as salts thereof, such as alkali metal and ammonium salts.

Example 1.—Preparation of 5-amino-3-methylthio-1,2,4-thiadiazole

A. In a 3-l., 3-necked flask, equipped with a mechanical stirrer, thiourea (76 g.=1.0 mole), methyl iodide (142 g.=1 mole), and anhydrous methanol (330 ml.) were stirred together. As soon as complete solution occurred, the reaction mixture began to warm up, and gradually rose to reflux temperature. After stirring at reflux for one hour, the condenser was set for distillation and approximately 70 ml. of the volatile materials were distilled, to remove any excess methyl iodide. The solution was cooled to room temperature and a solution of sodium thiocyanate (100 g.=1.25 moles) in anhydrous methanol (600 ml.) was added. The resulting solution was cooled to −15° C. by means of a Dry Ice-acetone bath. The flask was equipped with two dropping funnels. In one was placed a cold sodium methoxide solution prepared by dissolving sodium (46 g.=2 g. atoms) in anhydrous methanol (600 ml.); in the other funnel was placed a cold solution of bromine (160 g.=1 mole) in anhydrous methanol (425 ml.). With vigorous stirring, approximately ⅐ of the methoxide solution was run into the flask, then both solutions were added at the same rate during 1½ hours, keeping the temperature below −5° C. When the addition was completed, the cooling bath was removed, and the reaction mixture stirred for 2 hours at room temperature. The faintly alkaline solution was neutralized with conc. HCl, and the reaction mixture evaporated to dryness under reduced pressure. The residue was extracted with water to remove inorganic salts, then recrystallized from water with addition of charcoal. The weight of product was 104 g. (71%) melting at 139–42°.

Analysis.—Calcd. for: C=24.49%; H=3.40%; S=43.54%. Found: C=24.70%; H=3.49%; S=43.34%.

B. Methyl isothiuronium sulfate (Org. Syn. Coll., vol. II, p. 411) substituted for the in situ preparation of methyl isothiuronium iodide also gives a 71% yield of the 5-amino-3-methylthio-1,2,4-thiadiazole.

Example 2.—Preparation of 5-amino-3-ethylthio-1,2,4-thiadiazole

[Reference: Ber., 89, 2742 (1956)]

Ethyl bromide (109 g.=1 mole) was substituted for methyl iodide, and the preparation was carried out as described in Example 1 (A). The yield was 65%.

Example 3.—Preparation of 5-amino-1,2,4-thiadiazole

[Reference: Ber., 87, 57 (1954)]

Formamidine hydrochloride (40.3 g.=0.5 mole), sodium thiocyanate (45 g.=0.55 mole) and anhydrous methanol (400 ml.) were stirred together in a 2-l., 3-necked flask, equipped with a mechanical stirrer and 2 dropping funnels. The flask was immersed in a Dry Ice-acetone bath, and the contents cooled to −10° C. In one funnel was placed a sodium methoxide solution prepared by dissolving sodium (23 g.=1 g. atoms) in anhydrous methanol (300 ml.); in the other funnel was placed a solution of bromine (80 g.=0.5 mole) in anhydrous methanol (200 ml.). With vigorous stirring, the two solutions were added simultaneously during one hour, keeping the temperature between −5° and −10° C. When the addition was completed the reaction mixture was stirred for 2 hours at ice bath temperature. Fifteen ml. of acetic acid was added, and a saturated aqueous solution of sodium sulfide was added until a test with acidified KI solution liberated no more iodine. The inorganic salts were removed by filtration and washed with methanol, and the combined methanol solution and washings were evaporated to dryness on the steam bath under reduced pressure. The residue was extracted with ether in a Soxhlet extractor. After filtering a yellow solid from the ether, anhydrous hydrogen chloride was bubbled through the ether solution to precipitate the amine as its hydrochloride. The free base was regenerated by dissolving the hydrochloride in the minimum amount of water, basifying with concentrated $NH_4OH$, and extracting continuously with isopropyl acetate. The weight of 5-amino-1,2,4-thiadiazole thus obtained was 12.9 g. (25.5%) yield; M.P. 115–118° from benzene.

*Analysis.*—Calcd. for C=23.76%; H=2.97%; S=31.68%. Found: C=24.15%; H=3.17%; S=31.02%.

*Example 4.—Preparation of 5-amino-3-methylsulfonyl-1,2,4-thiadiazole*

5-amino-3-methylthio-1,2,4-thiadiazole (7.35. g=0.05 mole) was dissolved in acetic acid (100 ml.) by warming gently on the steam bath. The solution was cooled to 30° C., and 30% hydrogen peroxide (20.5 g.=0.15+20% excess) was added all at once, causing precipitation of a white solid. The mixture was stirred and warmed gently to effect solution. Solution occurred at about 50°, and the temperature then rose spontaneously to 70°. The solution was stirred until temperature dropped to 25°, and was then concentrated to about ¼ volume under reduced pressure. On standing, a white solid precipitated; the product was separated, washed with water and air-dried. Wt. 5.4 g. (65.2% of theory), M.P. 196.8° C. (from water).

*Analysis.*—Calcd. for: C=20.11%; H=2.80%; S=35.75%. Found: C=20.18%; H=3.00%; S=35.67%.

*Example 5.—Diazotization*

A. Nitrosylsulfuric acid was prepared by adding 1.52 g. (0.022 mole) of sodium nitrite portionwise to 10 ml. of concentrated sulfuric acid with stirring and allowing the temperature to rise to 65° C. The solution was then cooled to 5° C. and 20 ml. of a mixture of 3 ml. of propionic acid and 17 ml. of acetic acid was added dropwise with stirring, allowing the temperature to rise to 15° C. and keeping it there during the addition. The reaction mixture was cooled to 0–5° C. and 2.94 g. (0.02 mole) of 5-amino-3-methylthio-1,2,4-thiadiazole was added positionwise with stirring, after which 20 ml. more of the propionic-acetic acid mixture was added, keeping the temperature at 0–5° C. The reaction mixture was then stirred at 0–5° C. for 2 hours and the excess sodium nitrite was destroyed by adding 1 g. of urea. The clear diazonium solution was coupled as follows:

B. Coupling. 0.79 g. (0.0033 mole) of 6-amino-1-naphthol-3-sulfonic acid (J acid) was dissolved in 35 ml. of water containing 0.2 g. of sodium carbonate. Ice was added to the solution, and the beaker was immersed in an ice-bath for external cooling. One-sixth of the diazonium solution from (A) (0.0033 mole) was added slowly with stirring by hand. After standing for 15 minutes, cooled by the ice bath, 10 g. of anhydrous sodium acetate was added and the mixture stood in the ice bath for one hour, with occasional stirring after which 16.5 g. of sodium carbonate was carefully added. Then, an additional 23 g. of sodium carbonate was added all at once, followed by careful addition of another ⅓ of the diazonium solution from (A). After 10 minutes standing in the ice bath with occasional stirring, the mixture was filtered and pressed as dry as possible. The still wet cake, consisting largely of sodium carbonate, was dissolved in 20 ml. of water and the dye precipitated by addition of salt. After filtering and air-drying, the dye [6-amino-1-naphthol-2,5-bis(3-methylthio-1,2,4-thiadiazole-5-azo)-3-sulfonic acid, sodium salt] weighed 1.61 g.; 85% yield. The color on wool was red-violet. The dye has the formula

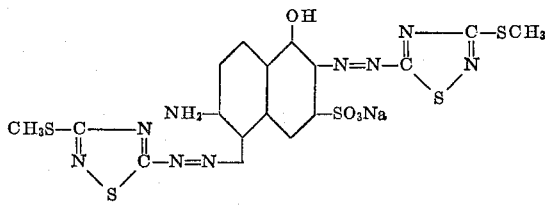

*Example 6*

0.79 g. (0.0033 mole) of 6-amino-1-naphthol-3-sulfonic acid was dissolved in 35 ml. of water containing 20 g. of sodium carbonate. Crushed ice was added to effect cooling, and the container was placed in an ice bath. 0.0033 mole of the diazonium solution from Example 5(A) was added carefully as rapidly as the foaming permitted. The mixture was allowed to stand for 10 minutes with occasional stirring, then filtered and dried in the air. To remove the sodium carbonate present in the cake, the solid was dissolved in 10 ml. of water and salt added to precipitate the dye. The weight was 0.85 g. (61.5% of dye [6 - amino - 1-naphthol-2-(3-methylthio-1,2,4-thiadiazole-5-azo)-3-sulfonic acid, sodium salt] which dyed wool a deep red-violet color. This dye has the formula

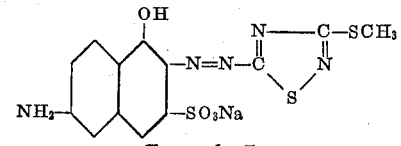

*Example 7*

Proceeding as in Example 5(B), 1.80 g. (0.005 mole) of 8-amino-1-naphthol-3,6-disulfonic acid, monosodium salt (H acid), was coupled first under acid conditions with 0.005 mole of the 5-amino-3-methylthio-1,2,4-thiadiazole diazonium solution prepared as in Example 5(A), then under strongly alkaline conditions with an additional 0.005 mole of the diazonium. Isolation of the dye from the contaminating sodium carbonate was accomplished by dissolving the crude cake in minimum quantity of water, and precipitating by action of salt. The weight of dye, 8 - amino - 1-naphthol-2,7-bis(3-methylthio-1,2,4-thiadiazole-5-azo)-3,6-disulfonic acid, disodium salt, was 3.00 g.; yield=86%. The color on wool was violet.

*Example 8.—Diazotization (A)*

Proceeding as in Example 5(A), 1.01 g. (0.01 mole) of 5-amino-1,2,4-thiadiazole was diazotized with nitrosylsulfonic acid in acetic propionic acid.

Coupling (B). Following the procedure as in Example 5(B), 1.80 g. (0.005) mole of 8-amino-1-naphthol-3,6-disulfonic acid, monosodium salt was dissolved in 50 ml. of water containing 25 g. of sodium carbonate, crushed ice added, and the mixture treated with 0.005 mole of the diazonium from (A) above. The weight of dye, 8-amino-1-naphthol-2-(1,2,4-thiadiazole-5-azo)-3,6-disulfonic acid, disodium salt, was 1.82 g.; yield=73.7%. The dye colored wool red-violet.

*Example 9*

1.71 g. (0.005 mole) of 8-amino-1-naphthol-5,7-disulfonic acid, monosodium salt (Chicago acid) was dissolved in 50 ml. of water containing 20 g. of sodium carbonate, ice was added and the mixture chilled in an ice bath to which 0.005 mole of the diazonium from Example 8(A) was carefully added. After 10 minutes, during which time the mixture was stirred occasionally, the mixture was treated with salt to precipitate the dye, 8-amino-1-naphthol-2-(1,2,4 - thiadiazole-5 - azo)-5,7-disulfonic acid, disodium salt, on drying, the dye weighted 1.63 g.;

yield=68.5% and dyed wool a deep red-violet color.

The following table describes additional dyes which are prepared in the manner described in the above specific examples.

| Diazonium R₂NNX | Coupler | Dye | Color |
|---|---|---|---|
| 1. (1 equivalent, acid coupling). Diazonium of 5-amino-3-methylsulfonyl-1,2,4-thiadiozole. | γ-acid | HO, N=NR₂, NH₂, NaO₃S on naphthalene | Red-violet. |
| 2. (Same as No. 1) (1 equivalent, alkaline coupling). γ-Acid does not give a disazo dye as do the other couplers. | | HO, R₂N=N–, –NH₂, NaO₃S on naphthalene | Violet. |
| 3. (Same as No. 1) (2 equivalents, alkaline coupling). S-acid, unlike the other couplers, gives a disazo dye in alkaline solution. | S-acid | HO, NH₂, R₂N=N–, –N=NR₂, SO₃Na on naphthalene | Bluish-red. |
| 4. (Same as No. 1) (1 equivalent, acid coupling). | M-acid | NH₂, NaO₃S–, –N=NR₂, OH on naphthalene | Red-violet. |
| 5. (Same as No. 1) (1 equivalent, alkaline coupling). | M-acid | NH₂, NaO₃S–, R₂N=N–, OH on naphthalene | Violet. |
| 6. (Same as No. 1) (2 equivalents, acid and then alkaline coupling). | M-acid | NH₂, NaO₃S–, –N=NR₂, R₂N=N–, OH on naphthalene | Bluish-red. |
| 7. Diazonium of 5-amino-3-isobutylthio-1,2,4-thiadiazole. (2 equivalents, acid then alkaline coupling). | K-acid | HO, NH₂, R₂N=N–, –N=NR₂, NaO₃S, SO₃Na on naphthalene | Reddish-blue. |
| 8. Diazonium of 5-amino-3-chloro-1,2,4-thiadiazole. (1 equivalent, acid coupling). | K-acid | HO, NH₂, –N=NR₂, NaO₃S, SO₃Na on naphthalene | Violet. |
| 9. Diazonium of 5-amino-3-benzylthio-1,2,4-thiadiazole. (1 equivalent, alkaline coupling). | K-acid | HO, NH₂, R₂–N=N–, NaO₃S, SO₃Na on naphthalene | Reddish-blue. |
| 10. Diazonium of 5-amino-3-benzylsulfonyl-1,2,4-thiadiazole. (1 equivalent, acid coupling). | K-acid | HO, NH₂, –N=NR₂, NaO₃S, SO₃Na on naphthalene | Bluish-red. |

In a similar manner, phenolic couplers such as salicylic acid yield useful dyes with the above 1,2,4-thiadiazoles.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. Azo compounds having the general formula

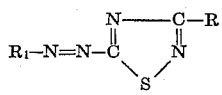

wherein R represents a lower alkylthio radical and $R_1$ represents a member of the class consisting of the residue of an amino-α-naphthol sulfonic acid coupling component and the residue of a lower 3-alkylthio-1,2,4-thiadiazolyl-azo-amino-α-naphthol sulfonic acid coupling component.

2. Azo compounds according to claim 1 wherein

R = a lower alkylthio radical and
$R_1$ = a residue of an amino-α-naphthol sulfonic acid coupling component.

3. A compound of the formula

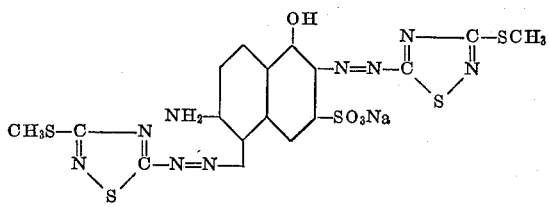

4. A compound of the formula

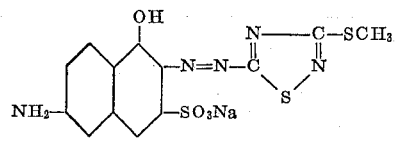

5. A compound of the formula

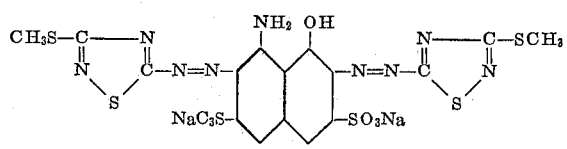

References Cited by the Examiner

UNITED STATES PATENTS 2,791,579   5/1957   Taube _____ 260—158

OTHER REFERENCES

Goerdeler et al., "Chem. Berichte," volume 89, pages 2742–2747, 1956.

Goerdeler et al., "Chem. Berichte," volume 87, pages 57–67, 1954.

Venkataraman, "The Chem. of Synthetic Dyes," volume 1, page 270, 1952.

CHARLES B. PARKER, *Primary Examiner.*